(12) United States Patent
Millward et al.

(10) Patent No.: US 6,324,228 B1
(45) Date of Patent: Nov. 27, 2001

(54) METHOD AND APPARATUS FOR ROBUST FREQUENCY TRACKING IN STRONG CHANNEL INTERFERENCE USING CARRIER SIGNAL RELATIVE STRENGTH AND FREQUENCY ERROR

(75) Inventors: Matthew C. Millward, Encinitas; Prasanna Desai, San Diego, both of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/223,462

(22) Filed: Dec. 30, 1998

(51) Int. Cl.[7] .............................. H04L 27/08; H04L 27/16
(52) U.S. Cl. ..................... 375/344; 375/345; 455/192.2; 455/245.1; 455/256
(58) Field of Search ..................................... 375/326, 344, 375/345; 455/192.2, 196.1, 200.1, 256, 182.2, 234.1, 245.1; 348/735

(56) References Cited

U.S. PATENT DOCUMENTS 5,940,748 * 8/1999 Daughtry, Jr. et al. ........... 455/182.2
5,970,105 * 10/1999 Dacus ................................... 375/344
5,982,821 * 11/1999 Kingston et al. ................... 375/326

* cited by examiner

*Primary Examiner*—Amanda T. Le
(74) *Attorney, Agent, or Firm*—Blakely, Sokoloff, Taylor & Zafman LLP

(57) ABSTRACT

The present invention is a method and apparatus for tracking a frequency of a signal. The received signal is converted to an intermediate frequency (IF) signal using a frequency reference. An automatic gain control (AGC) is provided to the IF signal. The AGC generates a control value. The magnitude and phase parameters of the IF signal are estimated. A frequency error is estimated based on the phase parameter. A control quantity is generated based of the control value, the estimated magnitude parameter and the estimated frequency error. The control quantity adjusts the frequency reference.

39 Claims, 9 Drawing Sheets

METHOD AND APPARATUS FOR ROBUST FREQUENCY TRACKING IN STRONG CHANNEL INTERFERENCE USING CARRIER SIGNAL RELATIVE STRENGTH AND FREQUENCY ERROR

BACKGROUND

1. Field of the Invention

This invention relates to communication systems. In particular, the invention relates to robust frequency tracking in a communication system.

2. Description of Related Art

A receiver in a mobile communication system receives a signal transmitted from a base station over a known frequency band. Typically, the receiver has an acquisition and tracking loop circuit to lock on the transmitted signal. The acquisition and tracking loop circuit has a frequency oscillator to generate a reference frequency for down converting the received signal to the intermediate or baseband frequency for further processing. The quality of the processed signal depends on the performance of the acquisition and tracking loop circuit.

There are many problems in a mobile communication system involving cellular receivers. Examples of these problems include adjacent channel interference (ACI), Doppler effects, and multipath fading. These problems degrade the quality of the received signal by introducing noise into the signal. In addition, there may be a frequency error between the transmitted signal and the received signal. The frequency error is caused by a number of error sources. Examples of these error sources include the frequency drift in the base station, the frequency drift in the receiver unit over the operating temperature range, and handoff during changeover between base stations.

If the frequency error of the receiver relative to the transmitter is large in the presence of other channel interference or if one of the adjacent interferering channels is large and the frequency error is moderately high, a frequency tracking loop has a tendency to pull towards the interfering channel instead of towards the signal of interest (SOI). In acquisition mode, this can lead to locking to an incorrect base station. In tracking mode, this situation occurs under handoff conditions at cell boundaries when the loop filter has more noise at its input due the low carrier-to-noise ratio (CNR) and an interfering channel carrier is stronger than the signal carrier. In the short duration between handoff from the current base station to the next base station, the tracking loop may be pulled toward an interfering channel resulting in a dropped call.

A method to prevent such a false locking (i.e., the tracking loop is pulled away by an interferering channel) is to use highly stable crystal oscillator with accuracy better than +5 parts per million (ppm). However, this method requires the use of a relatively expensive crystal oscillator, resulting in higher cost for the cellular handset.

Therefore there is a need in the technology to provide a robust and economical frequency tracking system and method to reduce the effect of interference in a mobile communication system.

SUMMARY

The present invention is a method and apparatus for tracking a frequency of a signal. The received signal is converted to an intermediate frequency (IF) signal using a frequency reference. An automatic gain control (AGC) is provided to the IF signal. The AGC generates a control value. The magnitude and phase parameters of the IF signal are estimated. A frequency error is estimated based on the phase parameter. A control quantity is generated based of the control value, the estimated magnitude parameter, and the estimated frequency error. The control quantity adjusts the frequency reference.

In a preferred embodiment, the control quantity is updated when the estimated receiver signal strength indicator (RSSI) value and the magnitude estimate of the signal are greater than the RSSI and magnitude thresholds, respectively. The control quantity is updated by a decision logic based on the results of comparing the frequency error with two gain thresholds. If the frequency error is within a predetermined deadzone range, the control quantity is not updated.

BRIEF DESCRIPTION OF THE DRAWINGS

The features and advantages of the present invention will become apparent from the following detailed description of the present invention in which.

DESCRIPTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

The present invention is a method and apparatus for tracking a frequency of a signal received by a receiver unit in a mobile communication system. The technique converts the received signal to an intermediate frequency (IF) signal using a reference frequency generator. An automatic gain control (AGC) processor provides gain to the IF signal and a control value to be used for estimating a receiver signal strength indicator (RSSI) balue. A magnitude parameter and a frequency error are estimated from the IF signal. From the magnitude parameter, the RSSI value, and the frequency error, an automatic frequency tracker and controller (AFTC) generates a control quantity which is used to adjust the frequency of the reference frequency generator. The control quantity is generated based on a decision logic. The technique provides a robust frequency tracking that avoids false locking in the frequency acquisition and tracking loop due to interference.

Definitions and Acronyms

AACI: adjacent and alternate channel In-phase
AACQ: adjacent and alternate Quadrature.
ADC: Analog-to-digital converter.
AFTC: Automatic frequency tracker and controller.
AGC: Automatic gain control.
CIR: Carrier-to-interference ratio.
CNR: Carrier-to-noise ratio.
DAC: Digital-to-analog converter.
DC: direct current.
DQM: Digital quadrature mixer, a digital mixer that receives a stream of digital input data and generate two streams of output data corresponding to an in-phase component and a quadrature component.
FM: Frequency modulated.
Handoff: a condition when a cellular unit crosses the coverage area of one base station and enters the coverage area of another base station.
I: In-phase.
IIR: Infinite impulse response.
IF: intermediate frequency.
KHz: Kilo Hertz.
LPF: Low-pass filter.
Q: Quadrature.
RSSI: Received signal strength indicator.
SOI: Signal of Interest.

Figure 1:
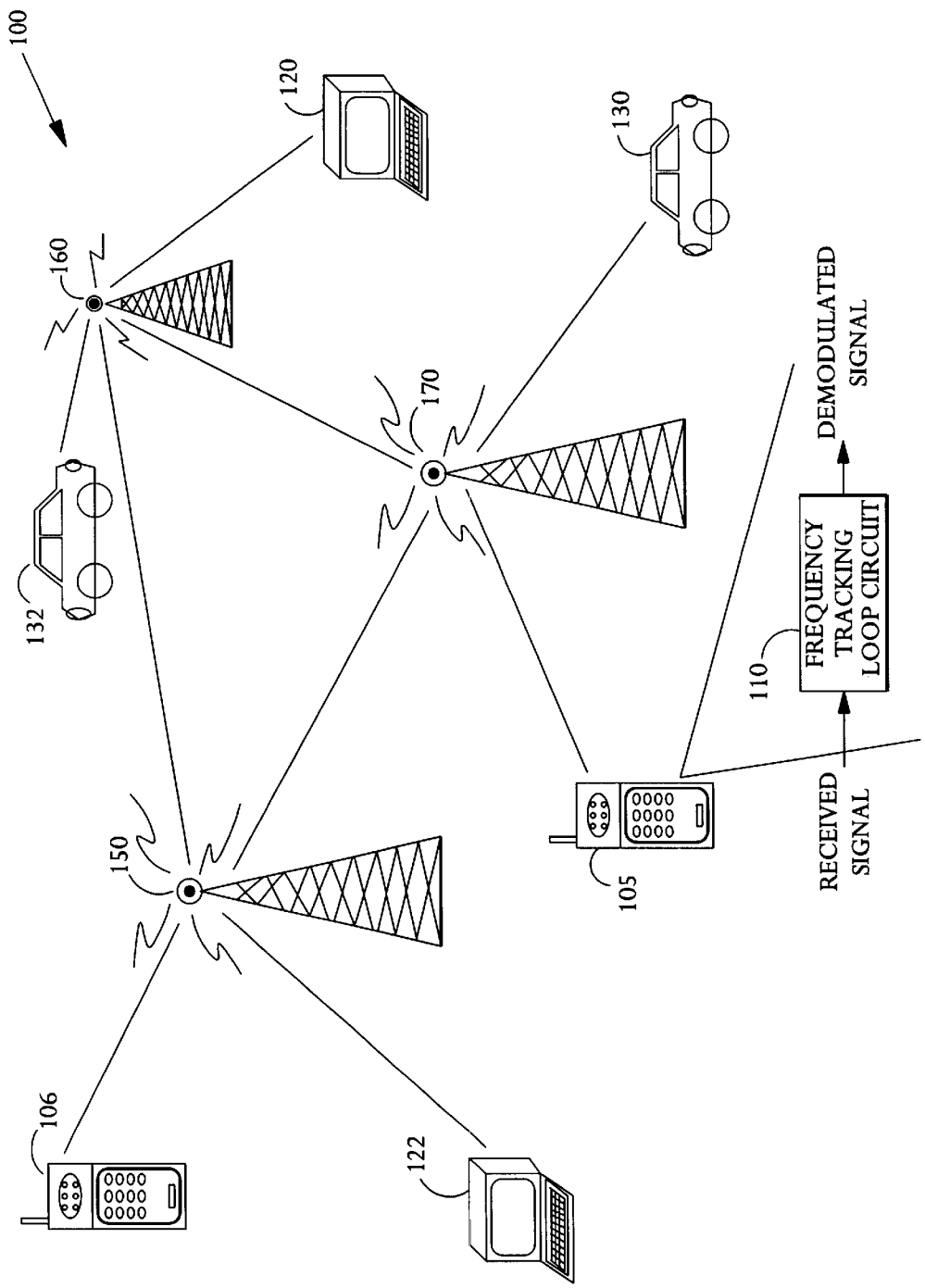
FIG. 1 is a diagram illustrating a system in which a preferred embodiment of the present invention can be practiced.

FIG. 1 is a diagram illustrating a system 100 in which a preferred embodiment of the apparatus and method of frequency tracking in the present invention can be practiced. The system 100 includes cellular phones 105 and 106, modem units inside computers 120 and 122, cellular phones inside cars 130 and 132, and base stations 150, 160, and 170.

The cellular phones 105 and 106, modem units inside computers 120 and 122, and cellular phones inside cars 130 and 132 are examples of communication units in a mobile communication system. Base stations 150, 160, and 170 generate transmitted signals to the communication units 105, 106, 120, 122, 130, and 132, and receive the signals generated by the communication units 105, 106, 120, 122, 130, and 132. An aspect of the present invention involves the use of the communication units as a receiver unit. In the following description, for brevity, the communication unit 105 is used. As is known by one skilled in the art, other communication units can be similarly described.

In the exemplary configuration in FIG. 1, the cellular phone 105 is within the range of the base station 170. The cellular phone 105 includes a frequency tracking loop circuit 110. The frequency tracking loop circuit 110 receives the transmitted signal and tracks the signal frequency. The frequency tracking loop circuit 110 generates a demodulated signal which is representative of the signal transmitted from the base station. The frequency tracking loop circuit 110 contains circuit elements and/or processors that perform automatic frequency tracking and control to maintain a robust frequency tracking and to avoid locking to false signals caused by adjacent channel interferences or frequency errors due to frequency drifts.

Figure 2:
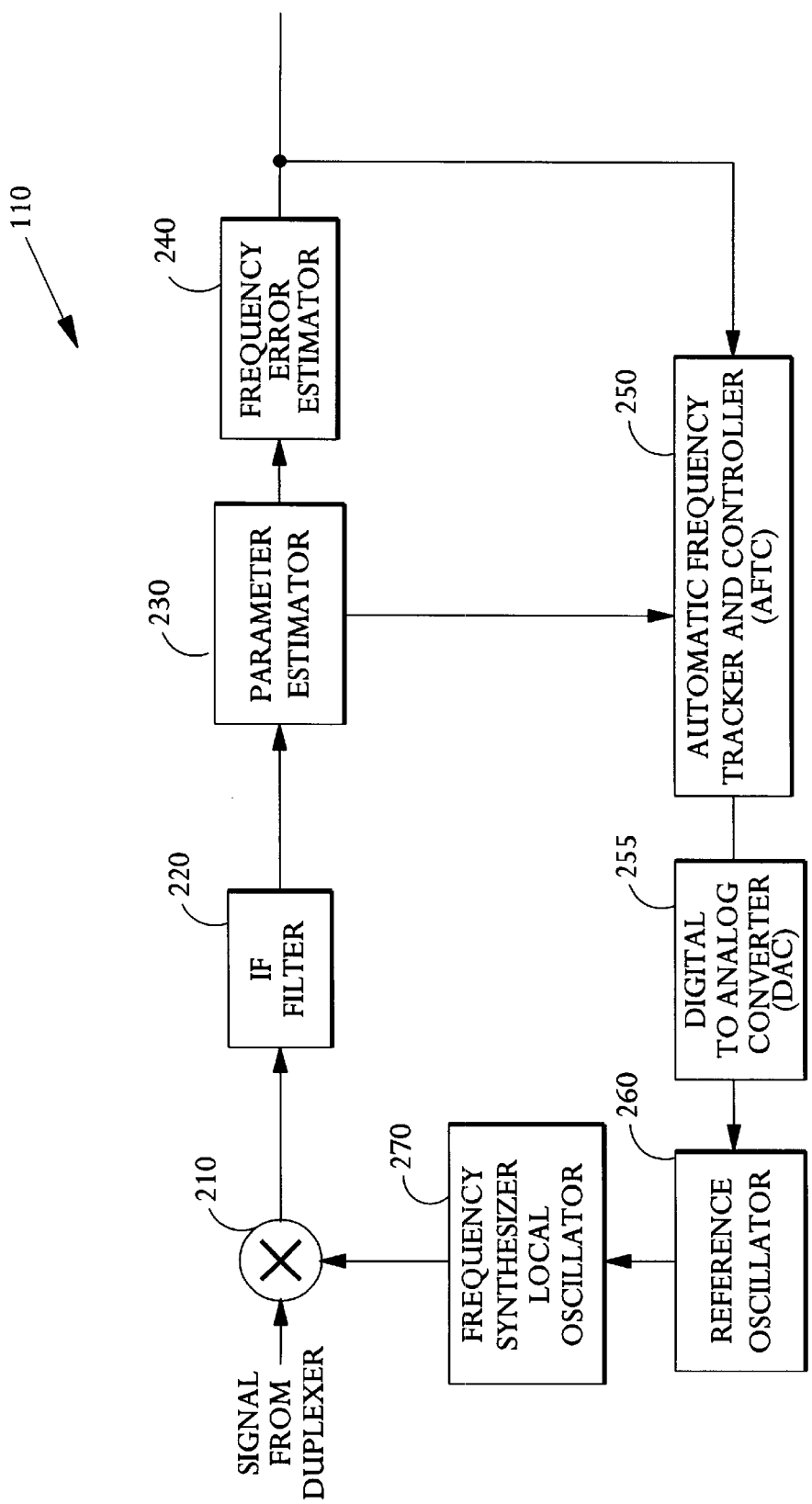
FIG. 2 is a diagram illustrating in detail a frequency tracking loop shown in FIG. 1 according to a preferred embodiment of the invention.

FIG. 2 is a diagram illustrating in detail a frequency tracking loop 110 shown in FIG. 1 according to a preferred embodiment of the invention. The frequency tracking loop circuit 110 includes a mixer 210, an intermediate frequency (IF) filter 220, a parameter estimator 230, a frequency error estimator 240, an automatic frequency tracker and controller (AFTC) 250, a digital-to-analog converter (DAC) 255, a reference oscillator 260, and a frequency synthesizer 270.

The mixer 210 multiplies the signal from the duplexer with a demodulating signal from the frequency synthesizer 270 to generate a demodulated signal. The demodulated signal has frequency components at IF and baseband frequency bands. The IF filter 220 filters out the IF components and retains the baseband components. The parameter estimator 230 estimates the parameters of the received signal. These parameters include a phase parameter and a magnitude parameter. The frequency error estimator 240 estimates a frequency error of the received signal. The frequency error corresponds to the difference between the frequency of the received signal and the frequency of the transmitted signal. The frequency error may be due to a number of sources. Examples of these sources include inaccuracy of the crystal oscillator, Doppler effects, and multipath fading.

The AFTC 250 receives the estimated parameters and the frequency error and generates a control quantity to the DAC 255. The AFTC 250 analyzes the estimated parameters and the frequency error to determine if a compensation for the frequency error is necessary, and if it is, by how much. The DAC 255 converts the digital control quantity into an analog control value to adjust the reference oscillator 260. The reference oscillator 260 produces a reference signal with a frequency adjusted by the control quantity to the frequency synthesizer 270. The frequency synthesizer 270 synthesizes the demodulating signal having the frequency adjusted to compensate for the frequency error.

Figure 3A:
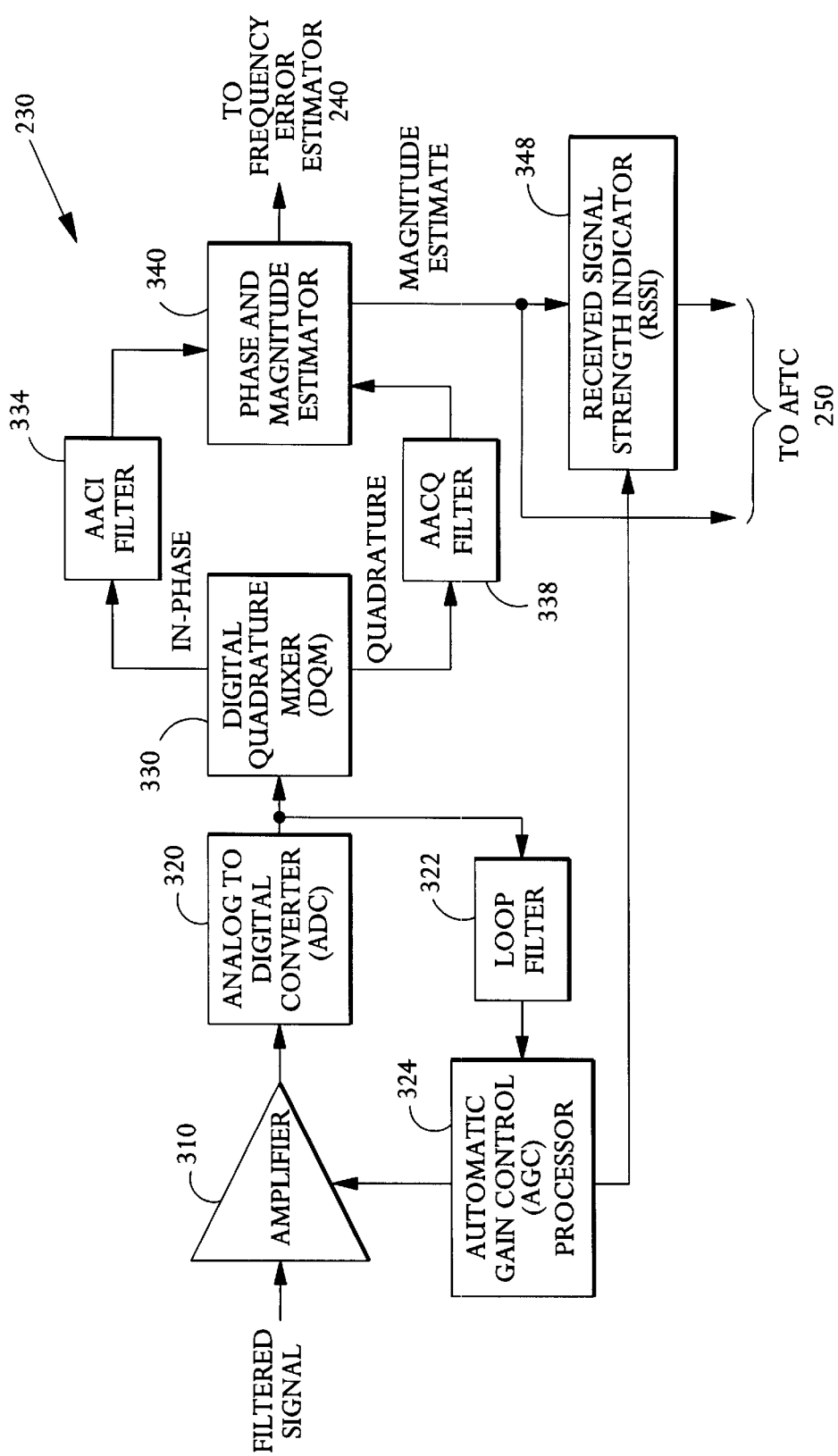
FIG. 3A is a diagram illustrating in detail a parameter estimator shown in FIG. 2 according to a preferred embodiment of the invention.

FIG. 3A is a diagram illustrating in detail a parameter estimator 230 shown in FIG. 2 according to a preferred embodiment of the invention. The parameter estimator 230 includes an amplifier 310, an analog-to-digital converter (ADC) 320, a loop filter 322, an automatic gain control (AGC) processor 324, a digital quadrature mixer (DQM) 338, an adjacent and alternate channel In-phase (AACI) filter 334, an adjacent and alternate channel Quadrature (AACQ) filter 338, a phase and magnitude estimator 340, and a received signal strength indicator (RSSI) 348.

The amplifier 310 amplifies the filtered signal to be within the operational range under the control of the AGC processor 324. The ADC 320 converts the analog amplified signal to digital data. The loop filter 322 provides the filtering necessary for the dynamics of the signal. The AGC processor 324 provides voltage gain to the filtered signal based on the loop filter output. The AGC processor 324 also generates a control signal and/or control value to the RSSI 348. The DQM 330 generates In-phase (I) and Quadrature (Q) components by multiplying the digital data with appropriate cosine and sine values, respectively. The AACI and AACQ filters filter out the adjacent and alternate channel components. In a preferred embodiment, the adjacent and alternate channels are located at ±30 KHz and ±60 KHz from the received signal, respectively.

The phase and magnitude estimator 340 estimates the phase and magnitude of the signal. In a preferred embodiment, the phase and magnitude estimator 340 use the CORDIC method to compute the phase and magnitude. The phase is computed as $\tan^{-1}$ (Q/I) and the magnitude is computed as the square root of $(I^2+Q^2)$ where I and Q are the two values after the AACI and AACQ filtering, respectively. The RSSI 348 computes the RSSI value based on the estimated magnitude.

The RSSI value and the magnitude estimate are two parameters that are indicative of the strength of the carrier signal relative to noise and interference, respectively. The RSSI value increases monotonically as the carrier-to-noise ratio (CNR) increases. If the CNR is low, then the AFTC calculations may be noisy, which may lead to larger frequency error than originally existed. Therefore, the AFTC processing is preferably performed in sufficiently high CNR conditions. The magnitude estimate is related to the carrier-to-interference ratio (CIR). If the CIR is low, the AFTC calculations may incorrectly tune to the channel of the interferer, introducing a large amount of frequency error. In the presence of interference, the signal of interest (SOI) is suppressed as the interferer dominates the power at the input to the AGC 310 (FIG. 3A). This condition is recognized by examining the magnitude estimate to determine if the SOI is below the AGC setpoint.

Figure 3B:
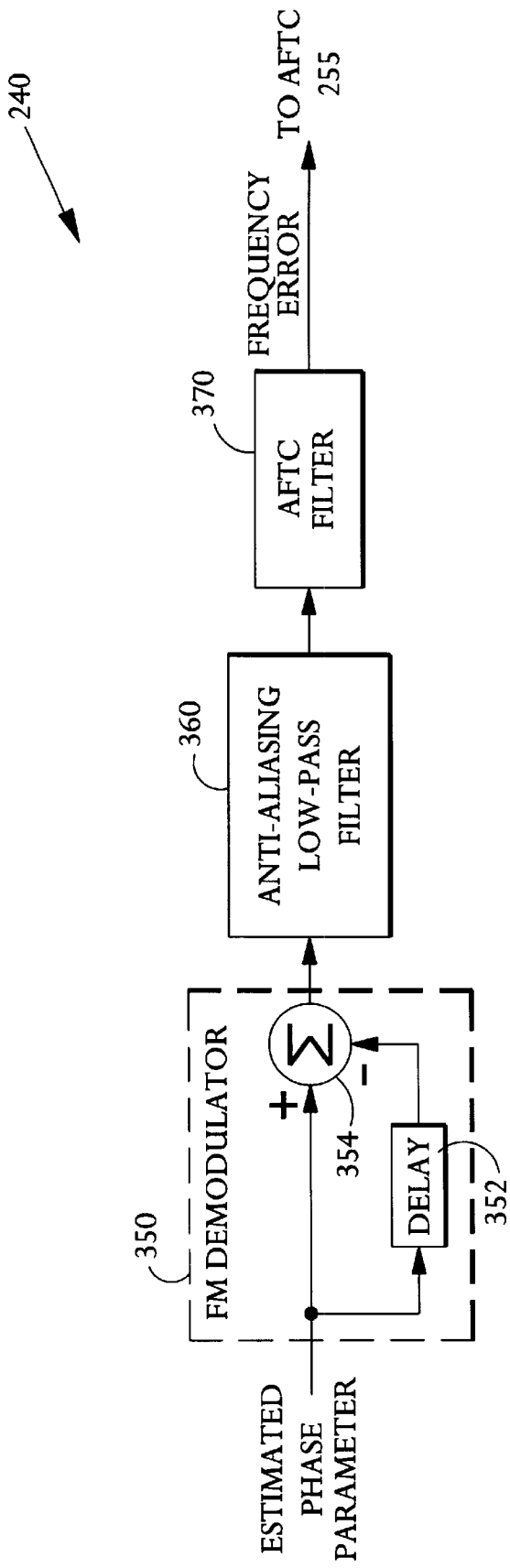
FIG. 3B is a diagram illustrating in detail a frequency error estimator shown in FIG. 2 according to a preferred embodiment of the invention.

FIG. 3B is a diagram illustrating in detail a frequency error estimator 240 shown in FIG. 2 according to a preferred embodiment of the invention. The frequency error estimator 240 includes a frequency modulated (FM) demodulator 350, an anti-aliasing low pass filter (LPF) 360 and an AFTC filter 370.

The FM demodulator 350 includes a delay 352 and an adder 354. The delay 352 delays the data by one clock period. The adder 354 adds the data and the delayed data. The anti-aliasing LPF 360 is a high order LPF that has steep cutoff characteristic to prevent aliasing upon further decimation to the sampling frequency. In a preferred embodiment, the sampling frequency corresponds to audio frequency at 8 KHz. The anti-aliasing LPF 360 has a cutoff frequency at about 3.4 KHz and decimates the samples to provide an 8 kHz output. The AFTC filter 370 generates the frequency error by extracting the DC value from the decimated samples of the anti-aliasing LPF 360. In a preferred embodiment, the AFTC filter 370 is a single pole infinite impulse response (IIR) filter operating at 8 KHz. The 3-dB bandwidth (in Hz) of the AFTC filter 370 may be found from:

$$f_{3dB}=\cos^{-1}\{-\alpha/2+2-(1/2\alpha)\}f_s/2\pi \text{ where } f_s=8 \text{ KHz.}$$

where $f_{3dB}$ is the frequency at which the response is 3 dB below the peak response, α is a selectable parameter, and $f_s$ is a sampling frequency.

The DC gain of the AFTC filter 370 is 1/1−α. The z-plane pole location of the AFTC filter 370 is programmable from [0 . . . 511]/512 which means that the 3-dB bandwidth of the AFTC filter 370 can be made as narrow as 2.49 Hz or bypassed altogether. In a preferred embodiment, the value of α is 450/512, resulting in a filter with a 3-dB bandwidth of 164.57 Hz and a DC gain of 8.26.

Figure 4:
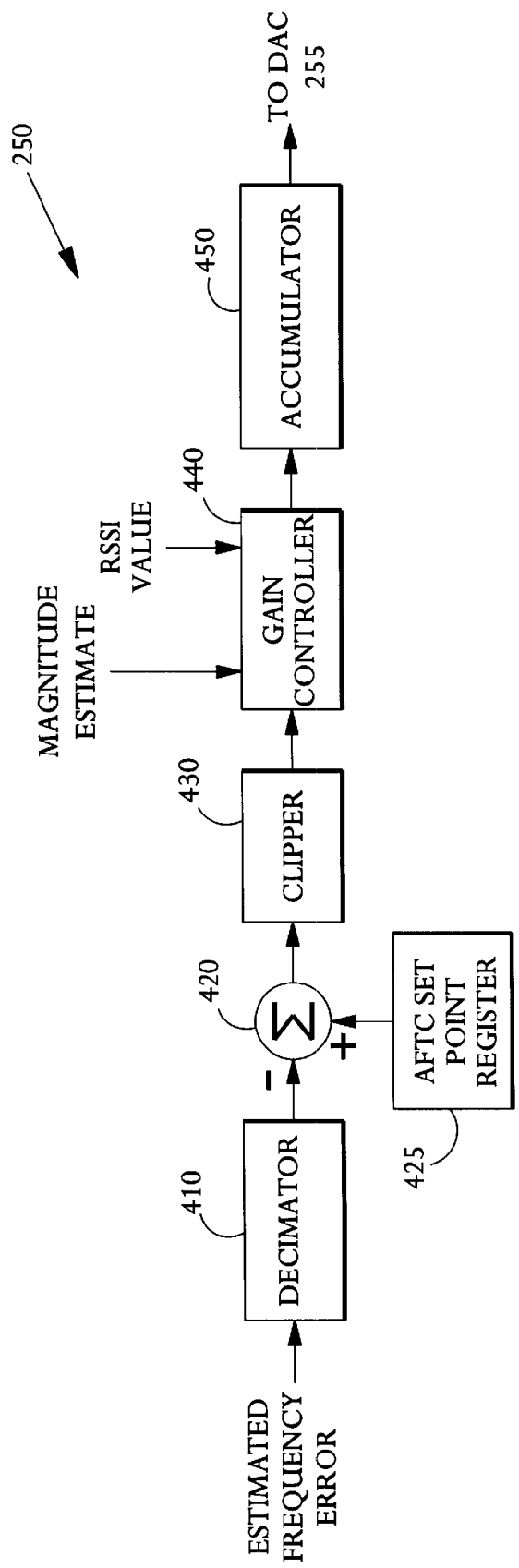
FIG. 4 is a diagram illustrating in detail an automatic frequency tracker and controller (AFTC) shown in FIG. 2 according to a preferred embodiment of the invention.

FIG. 4 is a diagram illustrating in detail an automatic frequency tracker and controller (AFTC) 250 shown in FIG. 2 according to a preferred embodiment of the invention. The AFTC 250 includes a decimator 410, a subtractor 420, an AFTC set point register 425, a clipper 430, a gain controller 440, and an accumulator 450.

The decimator 410 decimates the frequency error samples as generated by the frequency error estimator 270. In a preferred embodiment, the decimator rate is 5 samples. The subtractor 420 subtracts the decimated frequency error from the AFTC set point value in the AFTC set point register 425. The clipper 430 clips the result to a predefined maximum value. In a preferred embodiment, the frequency error samples are 16-bit, the decimated samples are 16-bit, the output of the subtractor is 17-bit, and the output of the clipper 430 is 16-bit.

The gain controller 440 performs the core of the AFTC calculations. The gain controller 440 receives the magnitude estimate and the RSSI value provided by the parameter estimator 230. The gain controller 440 has a decision logic to generate a gain value based on a comparison of the clipped value with two threshold values. The accumulator 450 generates a control quantity to the DAC 255 by accumulating the gain and clipping the accumulated gain. In a preferred embodiment, the generated gain is 8-bit and the clipped accumulated gain is 8-bit.

Figure 5:
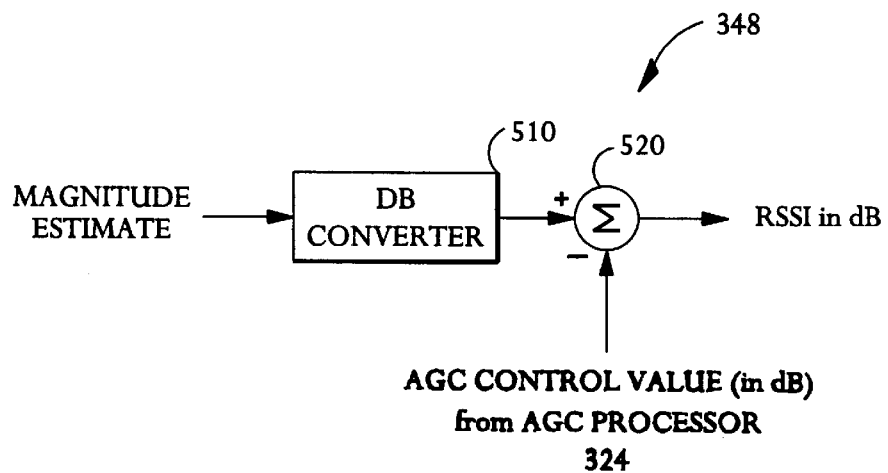
FIG. 5 is a diagram illustrating in detail a received signal strength indicator (RSSI) shown in FIG. 3A according to a preferred embodiment of the invention.

FIG. 5 is a diagram illustrating in detail a received signal strength indicator (RSSI) 348 shown in FIG. 3A according to a preferred embodiment of the invention. The RSSI 348 includes a decibel (dB) converter 510 and an adder 520.

The dB converter 510 computes the logarithm of the magnitude estimate provided by the parameter estimator 230. The adder 520 subtracts a value (in dB) provided by the AGC processor 324 (FIG. 3A) from the output of the dB converter 510 to produce an RSSI value (in dB) to be used by the AFTC 250. As discussed before, the RSSI value is related to the CNR and thus is used to determine if frequency updating is necessary.

Figure 6:
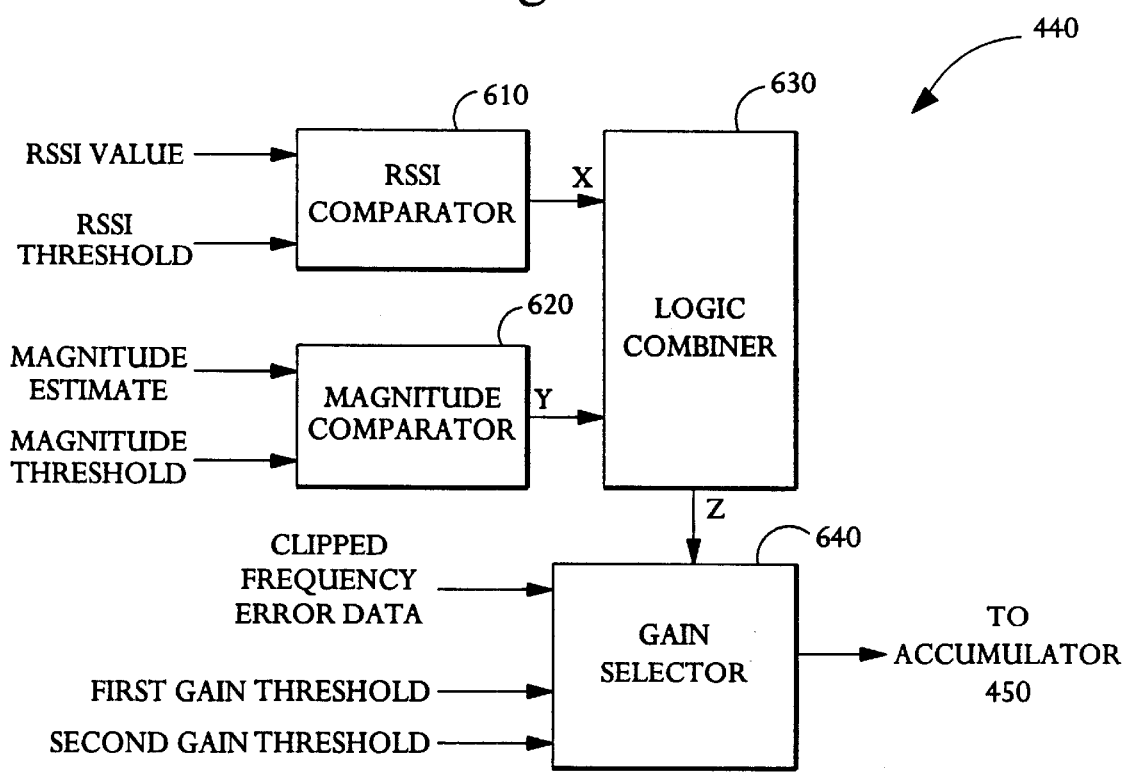
FIG. 6 is a diagram illustrating in detail a gain controller shown in FIG. 4 according to a preferred embodiment of the invention.

FIG. 6 is a diagram illustrating in detail a gain controller 440 shown in FIG. 4 according to a preferred embodiment of the invention. The gain controller 440 includes an RSSI comparator 610, a magnitude comparator 620, a logic combiner 630, and a gain selector 640.

The RSSI comparator 610 compares the RSSI value provided by the RSSI 348 (FIG. 5) with an RSSI threshold and generates an RSSI comparison result x. The magnitude comparator 620 compares the magnitude estimate provided by the parameter estimator 230 (FIG. 2) with a magnitude threshold and generates a magnitude comparison result y. The logic combiner 630 receives the results x and y and generates an update signal z to the gain selector 640. The update signal z is asserted if there is a need to update or select a new gain value as the control quantity. In a preferred embodiment, the x and y results are logic HIGH if the RSSI value and the magnitude estimate are greater than the RSSI threshold and the magnitude threshold, respectively. The logic combiner 630 may be an AND gate which generates a logic HIGH on the update signal z indicating that a new gain value is to be selected and a logic LOW indicating that there is no need to update the control quantity.

The gain selector 640 selects a gain value based on the update signal z from the logic combiner 630. The gain selector 640 receives the clipped frequency error from the clipper 430 (FIG. 4) and first and second gain thresholds and produces the gain value to the accumulator 450.

Figure 7:
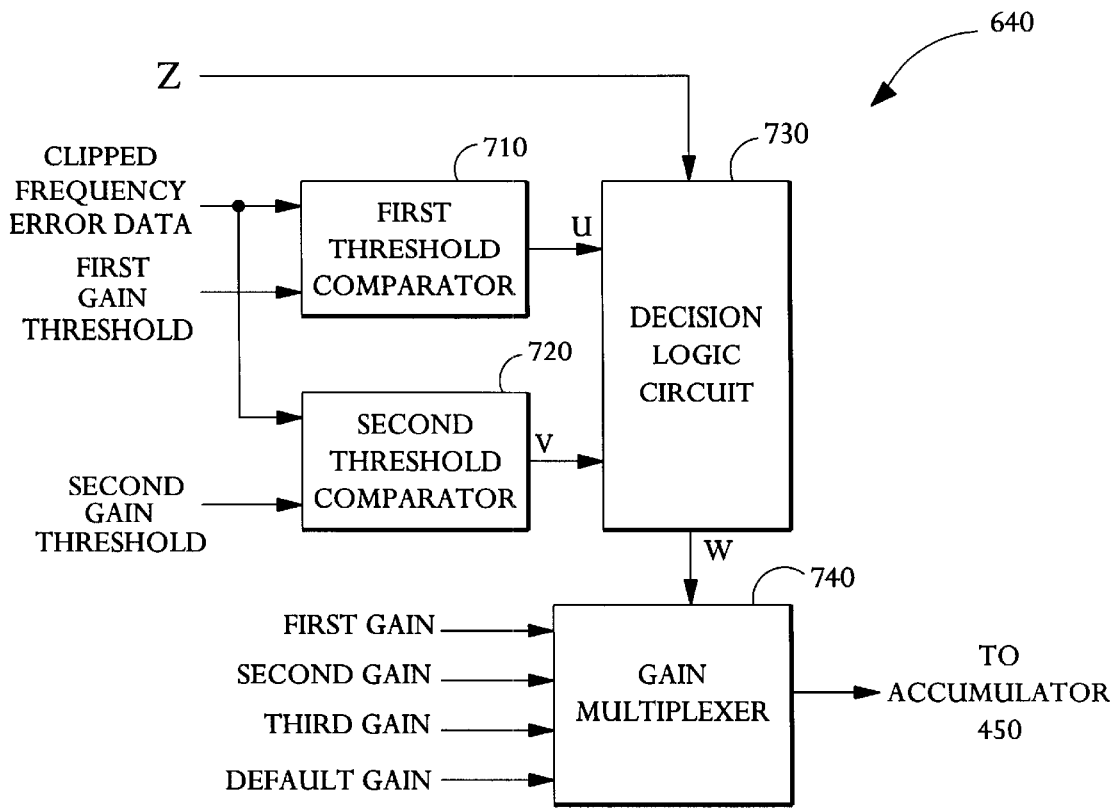
FIG. 7 is a diagram illustrating in detail a gain selector shown in FIG. 6 according to a preferred embodiment of the invention.

FIG. 7 is a diagram illustrating in detail a gain selector 640 shown in FIG. 6 according to a preferred embodiment of the invention. The gain selector 640 includes a first threshold comparator 710, a second threshold comparator 720, a decision logic circuit 730, and a gain multiplexer 740.

The first threshold comparator 710 compares the clipped frequency error with the first gain threshold and generates a first comparison result u. The second threshold comparator 720 compares the clipped frequency error with the second gain threshold and generates a second comparison result v. In a preferred embodiment, the second threshold value is larger than the first threshold value, and the results u and v are logic HIGH if the absolute value of the clipped frequency error is greater than the absolute values of the first and second gain thresholds, respectively.

The decision logic circuit 730 receives the update signal z from the logic combiner 630 (FIG. 6), the comparison results u and v and generates a select signal w. The update signal z determines if the control quantity or the gain value need to be updated and if the gain selection is performed. The decision logic circuit 730 performs a decision based on the comparison results. The gain multiplexer 740 selects one of the four gain values: first, second, third, and default gain values based on the select signal w.

Let the clipped frequency error be FE, the first threshold value be TH1, the second threshold value be TH2, the minimum value is MIN, and the maximum value be MAX. In a preferred embodiment, TH1<TH2, and MIN =−32678, MAX=+32767. Under this condition, the decision logic is as follows:

If −TH1<FE<TH1, then select the first gain value;
If −TH2<FE<−TH1 and TH1<FE<TH2, then select the second gain value.
If MIN<FE<−TH2 and TH2<FE<MAX, then select the third gain value.

The default gain value is selected at a default condition such as during initialization.

At cell boundaries, the CNR and the CIR are relatively low. Handoffs usually occur in these conditions. Under these conditions, the AFTC loop is more susceptible to being pulled away by a data-modulated interferer. The deadzone logic is employed to ensure that frequency corrections are not applied at a rate within the audible band. In other words, if the frequency error is small, then the AFTC DAC 255 is not updated and maintains the same value. The deadzone is a threshold region within which no updating is required. A small deadzone helps the frequency error settling close to zero. In a preferred embodiment, the deadzone is within ±1. Hysteresis can be added to the deadzone thresholds to prevent unwanted oscillations in the AFTC output.

Figure 8:
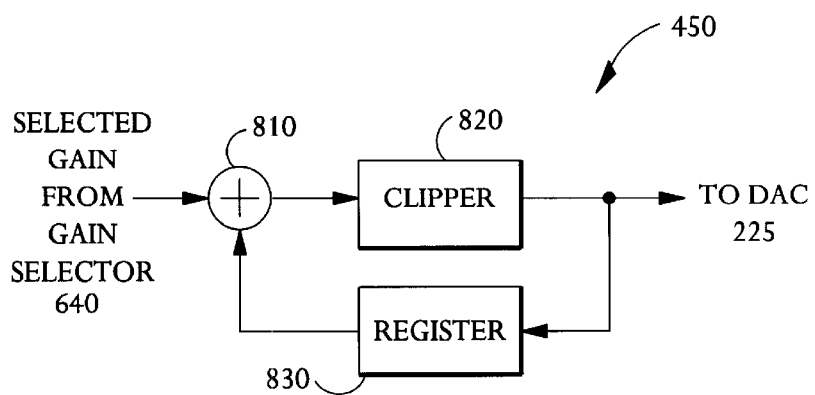
FIG. 8 is a diagram illustrating in detail an accumulator shown in FIG. 4 according to a preferred embodiment of the invention.

FIG. 8 is a diagram illustrating in detail an accumulator 450 shown in FIG. 4 according to a preferred embodiment of the invention. The accumulator 450 includes an adder 810, a clipper 820, and a register 830.

The adder 810 adds the selected gain value from the gain selector 640 (FIG. 6) to the value from the register 830. The clipper 820 clips the sum generated by the adder 810 to below a maximum value. The clipper 820 acts like a saturation logic, preventing an overflow result. The output of the clipper 820 is a digital control quantity to be sent to the DAC 225. The register 830 stores the output of the clipper 820 so that accumulation can be performed.

Figure 9:
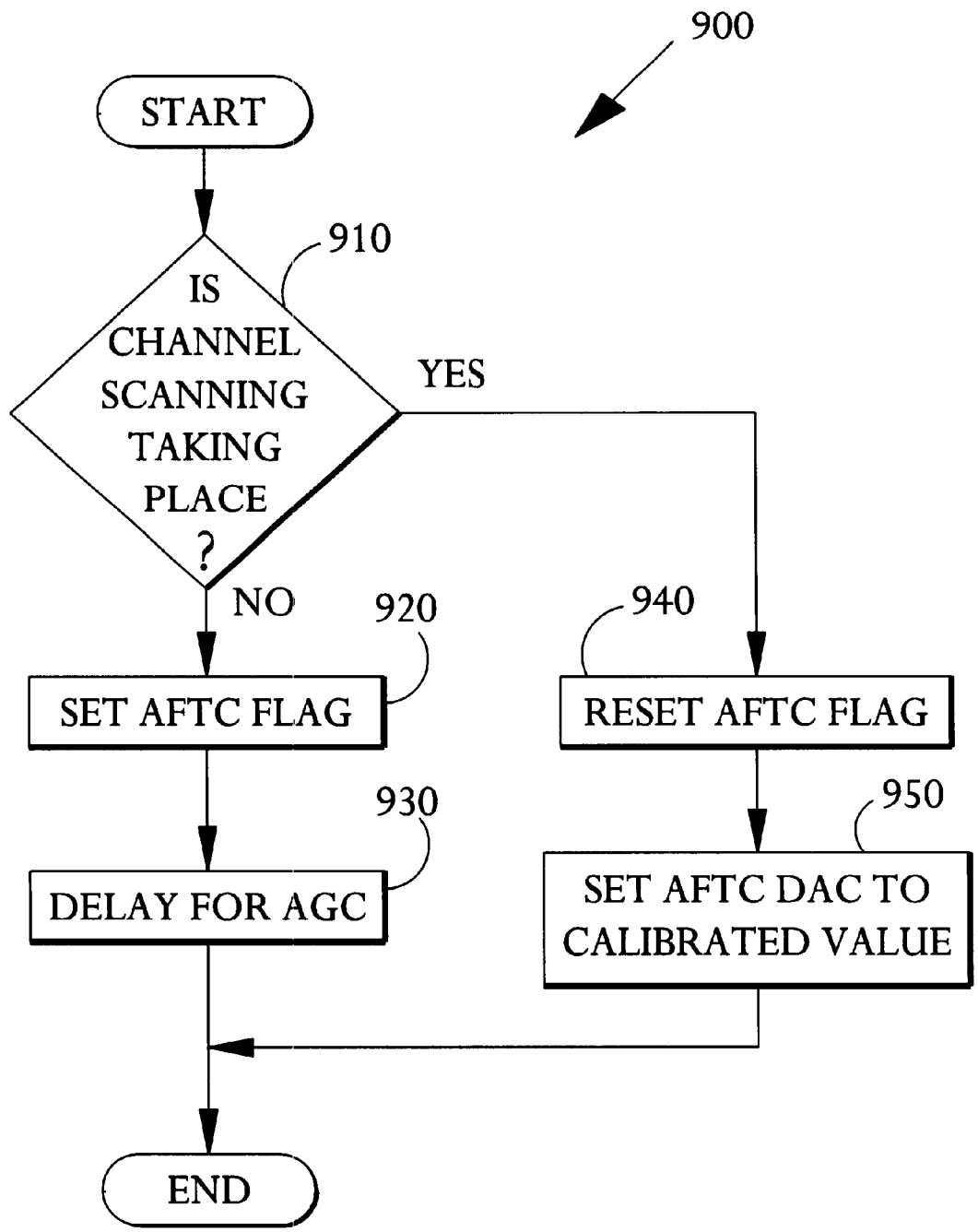
FIG. 9 is a flow chart illustrating a process for initializing the AFTC operation according to a preferred embodiment of the invention.

FIG. 9 is a flow chart illustrating a process 900 for initializing the AFTC operation according to a preferred embodiment of the invention.

Upon START, the process 900 determines if the receiver unit is scanning the channels (Block 910). If it is not scanning the channels, the process 900 sets an AFTC flag to indicate that a frequency tracking is to be performed (Block 920). Then the process 900 produces a delay to allow the automatic gain control (AGC) to settle (Block 930). In a preferred embodiment, this delay is about 20 msec. Then the process 900 is terminated.

If the receiver unit is scanning the channels, the process 900 resets the AFTC flag to indicate that a frequency tracking is not to be performed (Block 940). Then the process 900 sets the AFTC DAC 255 to a calibrated value, or a default value (Block 950). Then the process 900 is terminated.

Figure 10:
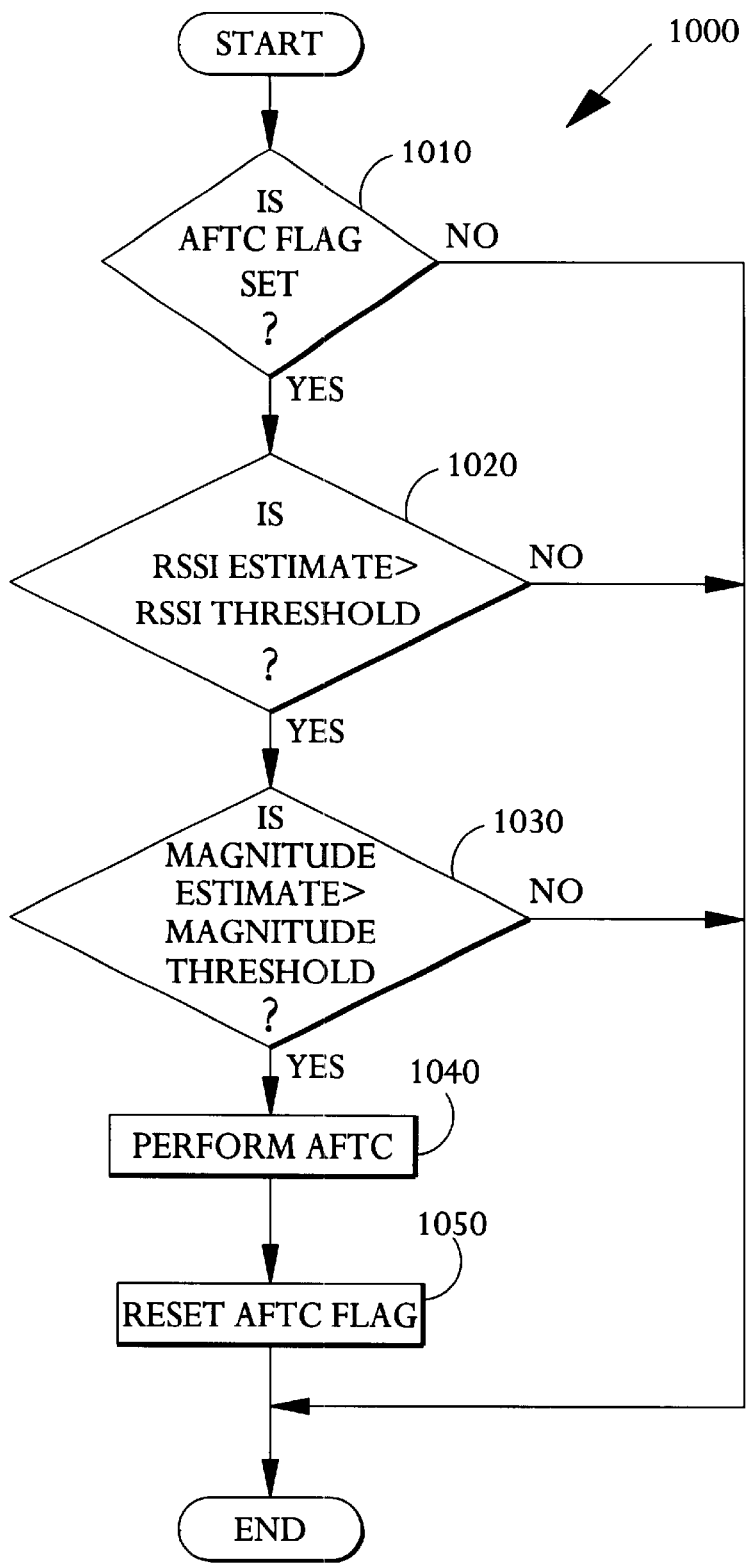
FIG. 10 is a flow chart illustrating a process for performing the AFTC operation according to a preferred embodiment of the invention.

FIG. 10 is a flow chart illustrating a process 1000 for performing the AFTC operation according to a preferred embodiment of the invention.

Upon START, the process 1000 determines if the AFTC flag is set (Block 1010). If not, the process 1000 is terminated. If the AFTC flag is set, the process 1000 next determines if the RSSI estimate is greater than the RSSI threshold (Block 1020). If not, the process 1000 is terminated. If the RSSI estimate is greater than the RSSI threshold, the process 1000 next determines if the magnitude estimate is greater than the magnitude threshold (Block 1030). If not, the process 1000 is terminated. Otherwise, the process 1000 proceeds to perform the automatic frequency tracking and control by generating the appropriate gain value to update the control quantity (Block 1040). The process 1000 then resets the AFTC flag indicating the no updating of the control quantity is necessary (Block 1050). Then the process 1000 is terminated.

The present invention provides a robust frequency tracking in a mobile communication system. The technique estimates the signal magnitude and frequency error to select an appropriate gain to control the oscillator in the feedback loop. The technique is efficient in avoiding false locking in the presence of interference and fading.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   converting a received signal to an intermediate frequency (IF) signal using a frequency reference;
   providing an automatic gain control (AGC) to the IF signal, the AGC generating a control value;
   estimating magnitude and phase parameters of the IF signal;
   estimating a frequency error based on the phase parameter;
   generating a control quantity to adjust the frequency reference, the control quantity being based on the control value, the estimated magnitude parameter, and the estimated frequency error.

2. The method of claim 1 wherein converting the received signal comprises:
   generating a demodulated signal by mixing a demodulating signal with the received signal; and
   generating the IF signal by filtering the demodulated signal.

3. The method of claim 2 further comprising:
   generating the reference frequency by a reference oscillator based on the control quantity; and
   synthesizing the demodulating signal based on the reference frequency by a local oscillator.

4. The method of claim 1 wherein estimating magnitude and phase parameters of the IF signal comprises:
   converting the IF signal to a digital data;
   generating in-phase (I) and quadrature (Q) components from the digital data; and determining the magnitude and phase estimates from the I and Q components, the magnitude and phase estimates corresponding to the magnitude and phase parameters, respectively.

5. The method of claim 4 further comprising:

amplifying the IF signal according to the AGC;

filtering the I and Q components; and determining a received signal strength indicator (RSSI) value from the magnitude estimate and the control value.

6. The method of claim 5 wherein determining the received signal strength indicator (RSSI) value comprises:

converting the magnitude estimate to a decibel value; and generating the RSSI value by subtracting the control value from the decibel value.

7. The method of claim 5 wherein generating a control quantity comprises:

selecting a gain value based on an error estimate of the frequency error, the magnitude estimate, and the RSSI value; and accumulating the gain value to provide the control quantity.

8. The method of claim 7 further comprising:

decimating the frequency error;

subtracting the decimated frequency error from a setpoint value to provide an error value; and generating the error estimate by clipping the error value to below a maximum value.

9. The method of claim 8 wherein selecting the gain value comprises:

generating first and second comparison results by comparing the RSSI value and the magnitude estimate with an RSSI threshold and a magnitude threshold, respectively;

generating an update signal by combining first and second results; and providing the gain value based on the update signal.

10. The method of claim 9 wherein providing the gain value comprises:

comparing the clipped error value with first and second gain thresholds to produce first and second gain results, respectively;

generating a gain select signal based on a decision, the decision using the first and second gain results and the update signal; and selecting one of predetermined gain values, the one of the predetermined gain values corresponding to the gain value.

11. The method of claim 10 wherein the one of predetermined gain values corresponds to a present value when the clipped error value is within a predetermined range.

12. The method of claim 7 wherein accumulating comprises:

adding the gain value to a feedback gain value to produce a sum;

clipping the sum to below a maximum gain value, the clipped sum corresponding to the control quantity; and storing the clipped sum to provide the feedback gain value.

13. The method of claim 1 wherein estimating a frequency error comprises:

generating a frequency difference by frequency modulated (FM) demodulating the estimated phase parameter;

anti-alias filtering the frequency difference; and generating the frequency error by decimating the anti-alias filtered frequency difference.

14. An apparatus comprising:

a converter for converting a received signal to an intermediate frequency (IF) signal using a frequency reference;

an automatic gain control (AGC) processor coupled to the converter for providing an AGC to the IF signal, the AGC processor generating a control value;

a parameter estimator coupled to the converter for estimating magnitude and phase parameters of the IF signal;

a frequency error estimator coupled to the parameter estimator for estimating a frequency error based on the phase parameter; and an automatic frequency tracker and controller (AFTC) coupled to the parameter and frequency error estimators for generating a control quantity to adjust the frequency reference, the control quantity based on the control value, the estimated magnitude parameter and the estimated frequency error.

15. The apparatus of claim 14 wherein the converter comprises:

a mixer for generating a demodulated signal by mixing a demodulating signal with the received signal; and a filter coupled to the mixer for generating the IF signal by filtering the demodulated signal.

16. The apparatus of claim 15 further comprising:

a reference oscillator for generating the reference frequency based on the control quantity; and a frequency synthesizer coupled to the reference osciilator for synthesizing the demodulating signal based on the reference frequency.

17. The apparatus of claim 14 wherein the parameter estimator comprises:

an analog-to-digital converter (ADC) for converting the IF signal to a digital data;

a digital quadrature mixer (DQM) coupled to the ADC for generating in-phase (I) and quadrature (Q) components from the digital data; and magnitude and phase estimators coupled to the DQM for determining the magnitude and phase estimates from the I and Q components, the magnitude and phase estimates corresponding to the magnitude and phase parameters, respectively.

18. The apparatus of claim 17 further comprising:

an amplifier coupled to the AGC processor for amplifying the IF signal according to the AGC;

adjacent and alternate channel (AAC) filters coupled to the DQM for filtering the I and Q components; and and RSSI coupled to the magnitude and phase estimators for determining a received signal strength indicator (RSSI) value from the magnitude estimate and the control value.

19. The apparatus of claim 18 wherein the RSSI comprises:

a decibel converter for converting the magnitude estimate to a decibel value; and a subtractor coupled to the decibel converter for generating the RSSI value by subtracting the control value from the decibel value.

20. The apparatus of claim 18 wherein the AFTC comprises:

a gain controller for selecting a gain value based on an error estimate of the frequency error, the magnitude estimate, and the RSSI value; and an accumulator coupled to the gain controller for accumulating the gain value to provide the control quantity.

21. The apparatus of claim 20 further comprising:

a decimator for decimating the frequency error, a subtractor coupled to the decimator for subtracting the decimated frequency error from a setpoint value to provide an error value; and a clipper coupled to the subtractor for generating the error estimate by clipping the error value to below a maximum value.

22. The apparatus of claim 21 wherein the gain controller comprises:

RSSI and magnitude comparators for comparing the RSSI value and the magnitude estimate with an RSSI threshold and a magnitude threshold, respectively, the RSSI and magnitude comparators generating first and second comparison results;

a logic combiner coupled to the RSSI and magnitude comparators for generating an update signal by combining first and second results; and a gain selector coupled to the logic combiner for providing the gain value based on the update signal.

23. The apparatus of claim 22 wherein the gain selector comprises:

first and second threshold comparators for comparing the clipped error value with first and second gain thresholds to produce first and second gain results, respectively;

generating a gain select signal based on a decision, the decision using the first and second gain results and the update signal; and selecting one of predetermined gain values, the one of the predetermined gain values corresponding to the gain value.

24. The apparatus of claim 23 wherein the one of predetermined gain values corresponds to a present value when the clipped error value is within a predetermined range.

25. The apparatus of claim 20 wherein the accumulator comprises:

an adder for adding the gain value to a feedback gain value to produce a sum;

a clipper coupled to the adder for clipping the sum to below a maximum gain value, the clipped sum corresponding to the control quantity; and a register coupled to the adder and the clipper for storing the clipped sum to provide the feedback gain value.

26. The apparatus of claim 14 wherein the frequency error estimator comprises:

a frequency modulated (FM) demodulator for generating a frequency difference by FM demodulating the estimated phase parameter;

an anti-alias filter coupled to the FM demodulator for filtering the frequency difference; and a decimating filter coupled to the anti-alias filter for generating the frequency error by decimating the anti-alias filtered frequency difference.

27. A system comprising:

a receiver for receiving a signal transmitted from a base station; and a communication unit for tracking a frequency of the signal, the communication unit comprising:

a converter for converting the received signal to an intermediate frequency (IF) signal using a frequency reference, an automatic gain control (AGC) processor coupled to the converter for providing an AGC to the IF signal, the AGC processor generating a control value, a parameter estimator coupled to the converter for estimating magnitude and phase parameters of the IF signal, a frequency error estimator coupled to the parameter estimator for estimating a frequency error based on the phase parameter, and an automatic frequency tracker and controller (AFTC) coupled to the parameter and frequency error estimators for generating a control quantity to adjust the frequency reference, the control quantity being based on the control value, the estimated magnitude parameter and the estimated frequency error.

28. The system of claim 27 wherein the converter comprises:

a mixer for generating a demodulated signal by mixing a demodulating signal with the received signal; and a filter coupled to the mixer for generating the IF signal by filtering the demodulated signal.

29. The system of claim 28 further comprising:

a reference oscillator for generating the reference frequency based on the control quantity; and a frequency synthesizer coupled to the reference osciilator for synthesizing the demodulating signal based on the reference frequency.

30. The system of claim 27 wherein the parameter estimator comprises:

an analog-to-digital converter (ADC) for converting the IF signal to a digital data;

a digital quadrature mixer (DQM) coupled to the ADC for generating in-phase (I) and quadrature (Q) components from the digital data; and magnitude and phase estimators coupled to the DQM for determining the magnitude and phase estimates from the I and Q components, the magnitude and phase estimates corresponding to the magnitude and phase parameters, respectively.

31. The system of claim 30 further comprising:

an amplifier coupled to the AGC processor for amplifying the IF signal according to the AGC;

adjacent and alternate channel (AAC) filters coupled to the DQM for filtering the I and Q components; and and RSSI coupled to the magnitude and phase estimators for determining a received signal strength indicator (RSSI) value from the magnitude estimate and the control value.

32. The system of claim 31 wherein the RSSI comprises:

a decibel converter for converting the magnitude estimate to a decibel value; and a subtractor coupled to the decibel converter for generating the RSSI value by subtracting the control value from the decibel value.

33. The system of claim 31 wherein the AFTC comprises:

a gain controller for selecting a gain value based on an error estimate of the frequency error, the magnitude estimate, and the RSSI value; and an accumulator coupled to the gain controller for accumulating the gain value to provide the control quantity.

34. The system of claim 33 further comprising:

a decimator for decimating the frequency error;

a subtractor coupled to the decimator for subtracting the decimated frequency error from a setpoint value to provide an error value; and a clipper coupled to the subtractor for generating the error estimate by clipping the error value to below a maximum value.

35. The system of claim 34 wherein the gain controller comprises:

RSSI and magnitude comparators for comparing the RSSI value and the magnitude estimate with an RSSI threshold and a magnitude threshold, respectively, the RSSI and magnitude comparators generating first and second comparison results;

a logic combiner coupled to the RSSI and magnitude comparators for generating an update signal by combining first and second results; and a gain selector coupled to the logic combiner for providing the gain value based on the update signal.

36. The system of claim 35 wherein the gain selector comprises:

first and second threshold comparators for comparing the clipped error value with first and second gain thresholds to produce first and second gain results, respectively;

generating a gain select signal based on a decision, the decision using the first and second gain results and the update signal; and selecting one of predetermined gain values, the one of the predetermined gain values corresponding to the gain value.

37. The system of claim 36 wherein the one of predetermined gain values corresponds to a present value when the clipped error value is within a predetermined range.

38. The system of claim 33 wherein the accumulator comprises:

an adder for adding the gain value to a feedback gain value to produce a sum;

a clipper coupled to the adder for clipping the sum to below a maximum gain value, the clipped sum corresponding to the control quantity; and a register coupled to the adder and the clipper for storing the clipped sum to provide the feedback gain value.

39. The system of claim 27 wherein the frequency error estimator comprises:

a frequency modulated (FM) demodulator for generating a frequency difference by FM demodulating the estimated phase parameter;

an anti-alias filter coupled to the FM demodulator for filtering the frequency difference; and a decimating filter coupled to the anti-alias filter for generating the frequency error by decimating the anti-alias filtered frequency difference.

* * * * *